(12) United States Patent
Rose et al.

(10) Patent No.: US 7,151,986 B2
(45) Date of Patent: Dec. 19, 2006

(54) DISTRIBUTED DRIVER SYSTEM FOR LOCOMOTIVE OR OHV

(75) Inventors: Gerald D. Rose, Erie, PA (US); Wolfgang Daum, Erie, PA (US)

(73) Assignee: General Electric Company, Schenectady, NY (US)

( * ) Notice: Subject to any disclaimer, the term of this patent is extended or adjusted under 35 U.S.C. 154(b) by 330 days.

(21) Appl. No.: 10/849,315

(22) Filed: May 19, 2004

(65) Prior Publication Data

US 2005/0258312 A1    Nov. 24, 2005

(51) Int. Cl.
*B61L 27/04* (2006.01)
*G06F 7/00* (2006.01)

(52) U.S. Cl. .................. 701/19; 701/1; 246/28 E; 246/86; 257/691

(58) Field of Classification Search .............. 701/1, 701/29, 31, 33, 36, 19; 246/4, 28 R, 86, 246/87, 28 E; 257/691; 702/63, 65; 323/268, 323/282
See application file for complete search history.

(56) References Cited

U.S. PATENT DOCUMENTS

| 6,434,452 | B1 * | 8/2002 | Gray ........................... 701/19 |
| 6,725,134 | B1 * | 4/2004 | Dillen et al. ................. 701/19 |
| 6,909,944 | B1 * | 6/2005 | Pillar et al. ................... 701/1 |

OTHER PUBLICATIONS

McMillen, B., "Diesel Locomotive Embedded Systems," Embedded Systems, University of Pittsburgh, 2003, pp. 1-14.

* cited by examiner

*Primary Examiner*—Tan Q. Nguyen
(74) *Attorney, Agent, or Firm*—Senniger Powers; Carlos Hanze

(57) ABSTRACT

A system for use with a locomotive or an off-highway vehicle (OHV) processor controlling an auxiliary device. A driver selectively energizes the auxiliary device. A driver switch for selectively activates the driver. A driver controller area network (CAN) microcontroller controls the driver switch. A panel switch selectively supplies power to the driver CAN microcontroller and the driver switch. A power distribution system connects the driver CAN microcontroller and the driver switch to the panel switch. A panel CAN microcontroller responsive to the processor controls the panel switch.

36 Claims, 3 Drawing Sheets

DISTRIBUTED DRIVER SYSTEM FOR LOCOMOTIVE OR OHV

BACKGROUND OF THE INVENTION

The invention generally relates to a system for use with a locomotive processor controlling an auxiliary device of the locomotive. In particular, the invention relates to a controller area network using a power distribution system to control auxiliary devices of a locomotive. The system is also applicable to an off-highway vehicle (OHV).

Originally, most auxiliary devices on locomotives were directly controlled by selectively supplying power or selectively inhibiting power applied to the auxiliary device. This required a separate set of power lines to each auxiliary device and high powers switches to connect each set of power lines to a power source.

As locomotive systems become modernized, there is a need for networks to be used to communicate with and control auxiliary equipment. There is also a need for such networks to employ serial communications which are less susceptible to noise and other environmental factors. There is also a need for such a system to be simple and low in cost to implement. There is also a need for such a system to be able to interface and be compatible with other networks that may be part of or used in conjunction with the auxiliary equipment of the locomotive. There is also a need for such a system to be configured so that it can be retrofitted to existing systems.

SUMMARY OF THE INVENTION

In one embodiment, the invention comprises a system for use with a processor of a locomotive or an off-highway vehicle (OHV), which processor controls an auxiliary device of the locomotive or OHV. A driver selectively energizes the auxiliary device of the locomotive or OHV. A driver switch selectively activates the driver. A driver controller area network (CAN) microcontroller controls the driver switch. A panel switch selectively supplies power to the driver CAN microcontroller and the driver switch. A power distribution system connects the driver CAN microcontroller and the driver switch to the panel switch. A panel CAN microcontroller responsive to the processor controls the panel switch.

In another embodiment, the invention comprises a system for use with a locomotive or an off-highway vehicle (OHV) processor controlling an auxiliary device of the locomotive or OHV. A driver opens and closes a device for selectively energizing the auxiliary device of the locomotive or OHV. A driver controller area network (CAN) microcontroller is associated with the driver switch. A panel switch selectively supplies power to the driver. A power distribution system connects the driver to the panel switch. A panel CAN microcontroller associated with the processor interfaces with the driver CAN microcontroller.

In another embodiment the invention comprises a retrofit system for use with a processor of a locomotive or an off-highway vehicle (OHV), which processor controls an auxiliary device of the locomotive or OHV. The locomotive includes a driver for selectively energizing the auxiliary device of the locomotive or OHV, a panel switch for selectively supplying power to the driver, and a power distribution system connecting the driver to the panel switch. The retrofit system comprises a driver switch adapted to selectively activate the driver, and a driver controller area network (CAN) microcontroller for controlling the driver switch. The driver CAN microcontroller is adapted to receive power from and is connected to the power distribution system. The system also includes a panel CAN microcontroller responsive to the processor for controlling the panel switch. The panel CAN microcontroller is adapted to receive power from and is connected to the power distribution system. The driver CAN microcontroller and the panel CAN microcontroller communicate with each other via the power distribution system.

In another embodiment, the invention comprises a retrofit system for use with a locomotive or an off-highway vehicle (OHV) processor controlling an auxiliary device of the locomotive or OHV, said locomotive or OHV including a driver for selectively energizing the auxiliary device of the locomotive or OHV, a panel switch for selectively supplying power to the driver, and a power distribution system connecting the driver to the panel switch. The retrofit system comprises a driver controller area network (CAN) microcontroller associated with the driver and coupled to the power distribution system, and a panel CAN microcontroller associated with the processor and coupled to the power distribution system. The driver CAN microcontroller and the panel CAN microcontroller communicate with each other via the power distribution system.

DETAILED DESCRIPTION OF THE INVENTION

Figure 1:
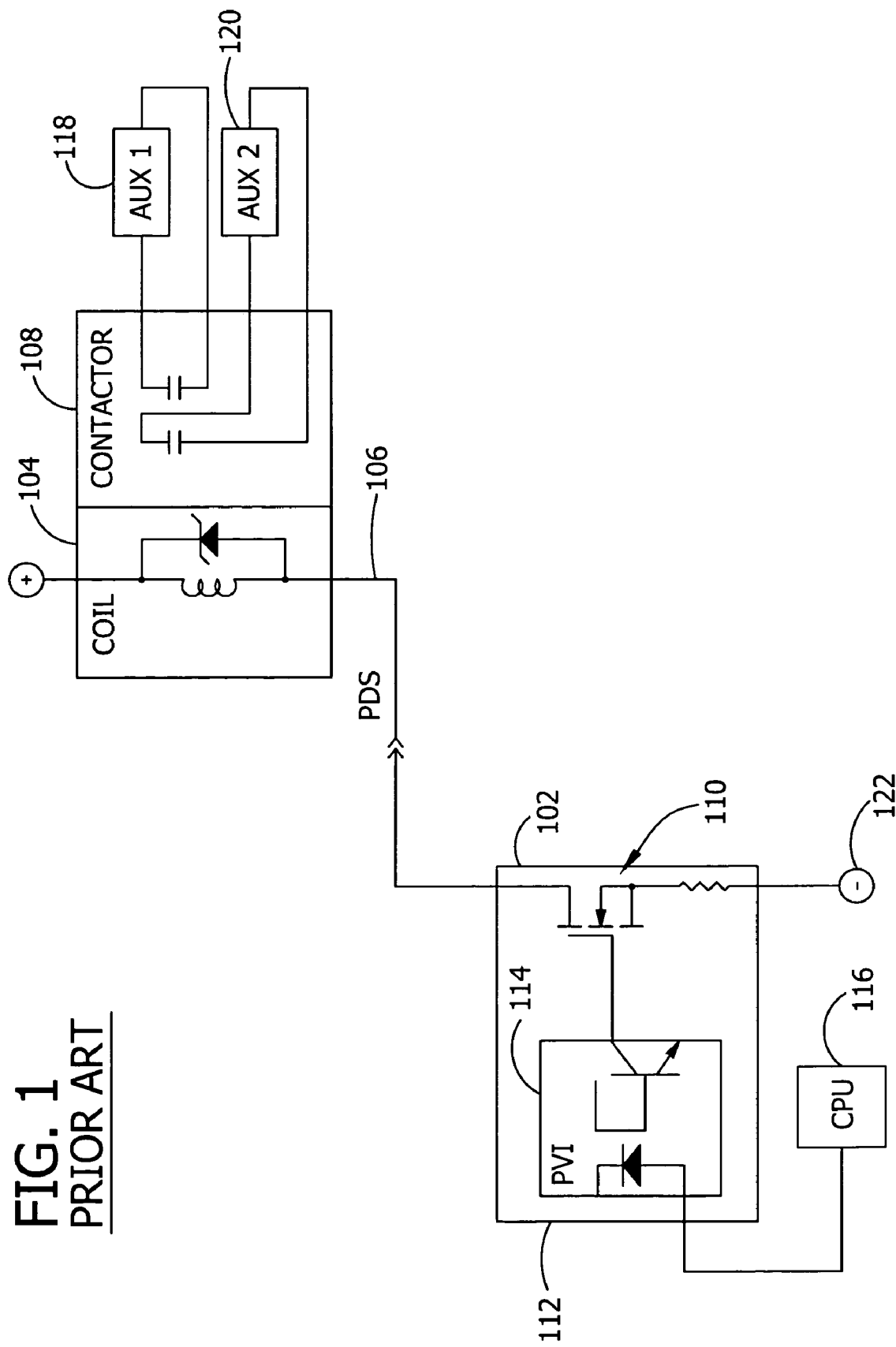
FIG. 1 is a schematic diagram of a prior art locomotive system showing a digital output driver driving a contactor coil via a power distribution system (PDS).

FIG. 1 is schematic diagram of a prior art locomotive system showing a digital output driver 102 driving a device such as a contactor coil 104 and associated contactors 108 via a power distribution system (PDS) 106. In this embodiment, the power distribution system 106 is illustrated as a single wire that connects the coil 104, which opens and closes contactor 108, to a power source 122 via a field effect transistor (FET) 110 in a control panel 112. The FET 110 is selectively opened and closed to selectively energize the coil 104 thereby opening and closing the contactors 108. The FET 110 is driven through a photo voltaic isolator (PVI) 114 or other type of voltage isolation device in order to isolate a control CPU (central processing unit) 116 and other electronics from any voltage transients on the power distribution system 106 caused by the coil circuit or devices connected to the power distribution system 106.

The contactor coil 104 and contactor 108 are controlled by the CPU 116 to selectively energize a first auxiliary device 118 and to selectively energize a second auxiliary device 120. In operation, the CPU 116 provides a signal to the photo voltaic isolator 114 which in turn converts the signal into a voltage applied to the base of the FET 110 which selectively closes the FET thereby connecting the power source 122 to the coil 104 via the power distribution system 106. By energizing the coil 104, one or more of the contactors 108 is closed in order to energize either the first auxiliary device 118 and/or the second auxiliary device 120.

Figure 2:
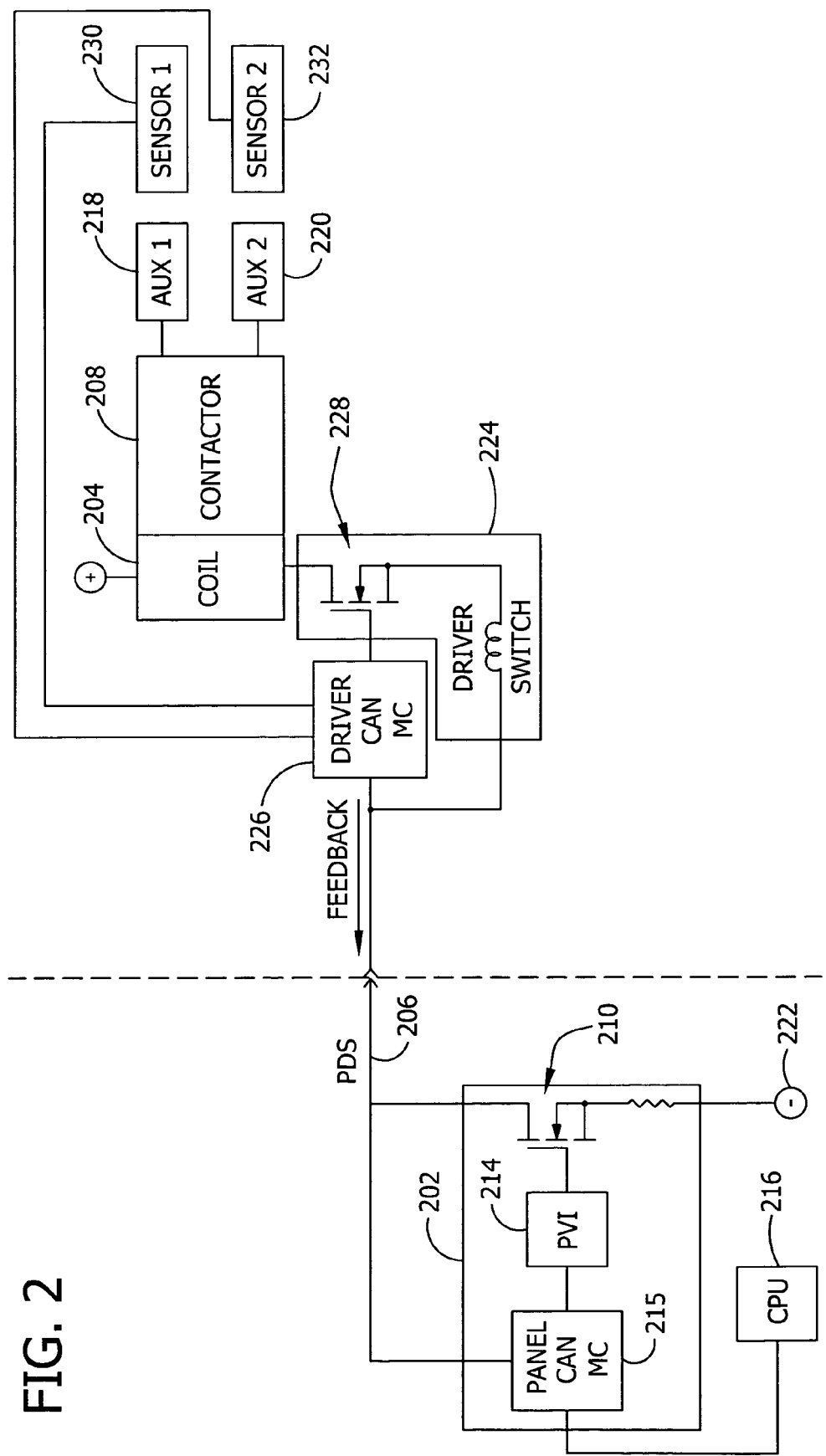
FIG. 2 is a schematic diagram of one embodiment of a CAN based distributed driver locomotive system according to the invention wherein a panel controller area network (CAN) microcontroller responsive to a locomotive central processing unit (CPU) interfaces with a driver CAN microcontroller which selectively energizes a device such as a contactor coil and associated contactor via a power distribution system.

FIG. 2 is a schematic diagram of one embodiment of a controller area network (CAN) based distributor driver system for a locomotive according to the invention. Although the invention is described herein in the context of a locomotive, it is contemplated that the invention includes the system as part of the off-highway vehicle (OHV). A digital output driver 202 drives a contactor coil 204 via a power distribution system 206. In this embodiment, the power distribution system 206 is illustrated as a single wire that connects the coil 204 of a contactor 208 to a power source 222 via an FET 210 in a control panel 212. The FET opens and closes to switch the power distribution system 206 on and off and to selectively apply power to the circuitry to the right of the dashed line which would be remote from the control circuitry to the left of the dashed line. The FET 210 is driven through a photo voltaic isolator 214 or other type of voltage isolation device in order to isolate the control electronics from any voltage transients in the contactor circuit. In the embodiment as illustrated in FIG. 2, the control electronics include a panel controller area network microcontroller (CAN MC) 215 responsive to a CPU (central processing unit) 216. The panel CAN MC 215 also is connected to the power distribution system to provide communication signals which are modulated onto the power distribution system 206 and to receive modulated communication signals which are on the power distribution system 206.

At the remote location to the right of the dashed line, a driver switch 224 and a driver CAN MC 226 are connected to the power distribution system to control the selective energization of the coil 204 and contactor 208. In this exemplary embodiment, the driver CAN MC 226 controls an FET 228 which is connected to the power distribution system 206 and selectively applies power to the coil 204. The driver CAN MC 226 is also connected to the power distribution system 206 to receive modulated communication signals which are provided on the power distribution system 206 and for providing communication signals onto the power distribution system 206.

In operation, the CPU 216 controls the panel CAN MC 215 and provides central control signals thereto which are used to control the FET 210 via the photo voltaic isolator 214. In addition, the central control signals are converted into CAN communication signals which are modulated onto the power distribution system 206 for communication to other driver CAN devices such as the driver CAN MC 226 connected to the power distribution system 206. For example, CPU 216 may indicate to the panel CAN MC 215 to close FET 210 and to instruct driver CAN MC 226 to close FET 228. This would result in energization of the coil 204 and its associated contactors 208 so that a first auxiliary device 218 and a second auxiliary device 220 would be selectively energized.

Another feature some embodiments of this invention as illustrated in FIG. 2 includes feedback information provided from the driver CAN MC 226 to the CPU 216 via the panel CAN MC 215. For example, a first sensor 230 may monitor an operational parameter of the first auxiliary device 218 and provide first sensing signals to the driver CAN MC 226. Similarly, a second sensor 232 may be associated with the second auxiliary device 220 to sense a parameter or other aspect of the device and provide a second sensing signal to the driver CAN MC 226. The driver CAN MC 226 converts the first and second sensor signals into modulated communication signals which are imposed upon the power distribution system 206. The panel CAN MC 215 receives the modulated communication signals representing the first and second sensor signals and provides the information modulated in the signals to the CPU 216. Thus, the CPU 216 is able to be responsive to the first and second sensors 230, 232. For example, the CPU 216 can confirm that the first auxiliary device is properly operating (or not operating) based on the first sensor signal being provided by the first sensor 230. If the device is improperly operating or not operating, the CPU may take certain action such as resetting the system or notifying an operator of a potential problem.

In one embodiment according to the invention, the system of FIG. 2 is for use with a locomotive CPU 216 controlling first and second auxiliary devices 218 and 220 of a locomotive. Thus, coil 204 constitutes a driver for opening and closing a contactor 208 for selectively energizing the first and/or second auxiliary devices 218 and 220 of the locomotive. Driver switch 224 selectively activates the coil 204 in response to control signals and the control of the driver CAN MC 215, which control signals are being provided over the power distribution system 206. In this embodiment, FET 210 constitutes a panel switch for selectively supplying power to the driver CAN MC 226 and to the driver switch 224 via the power distribution system 206 which connects both to the power source 222. The panel CAN MC 215 is responsive to the CPU 216 for controlling the panel switch in the form of FET 210 via the photovoltaic isolator 214.

In general, the remote aspects of the system to the right of the dashed line provide feedback information to the control aspects of the system to the left of the dashed line. In particular, the driver CAN MC 226 provides to the panel CAN MC 215 via the power distribution system 206 one or more feedback signals. This feedback signal may simply be an acknowledgment of receiving a signal from the panel CAN MC 215 or it may be a signal including information about the status of the driver switch 224, the coil 204, the contactor 208, either or both of the auxiliary devices 218, 220 or information provided to the driver CAN MC 226 by the first and second sensors 230 and 232. One purpose of this feedback may also be simply to allow communication between the driver CAN MC 226 and the panel CAN MC 215. In addition, the panel CAN MC 215 may provide a signal corresponding to the feedback signal to the CPU 216 for updating the status of the remote aspects of the system to the CPU 216.

In particular, according to one embodiment of the invention, the feedback information may comprise auxiliary sensor feedback information. In particular, the first and second sensors 230 and 232 associated with the first and second auxiliary devices 218 and 220 provide first and second sensor signals to the driver CAN MC 226. In response, the driver CAN MC 226 provides to the panel CAN MC 215 via the power distribution system 206 corresponding feedback signals. In addition, the panel CAN MC 215 may provide a corresponding signal relating to the feedback to the CPU 216.

It is also contemplated that the invention in one embodiment may comprise a retrofit system for use with a processor 216 of a locomotive(and/or OHV) which processor 216 controls an auxiliary device(s) 218, 220 of the locomotive. In this embodiment, driver 204, 208 selectively energizes the auxiliary device(s) 218, 220 of the locomotive. The panel switch 10 selectively supplies power to the driver 204, 208 via the power distribution system 206 which connects the driver 204, 208 to the panel switch 210. In this embodiment, the retrofit system comprises the driver switch 224, the driver CAN microcontroller 226 and the panel CAN microcontroller 215. The driver switch 224 is inserted in series between the driver 204, 208 and panel switch 210 and adapted to selectively activate the driver 204, 208. The driver CAN microcontroller 226 controls the driver switch 224 so that the driver CAN microcontroller 226 is adapted to receive power from and is connected to the power distribution system 206. The panel CAN microcontroller 215 is responsive to the processor 216 and controls the panel switch 210. The panel CAN microcontroller 215 is adapted to receive power from and is connected to the power distribution system 206 and the driver CAN microcontroller 226 and the panel CAN microcontroller 215 communicate with each other via the power distribution system.

Figure 3:
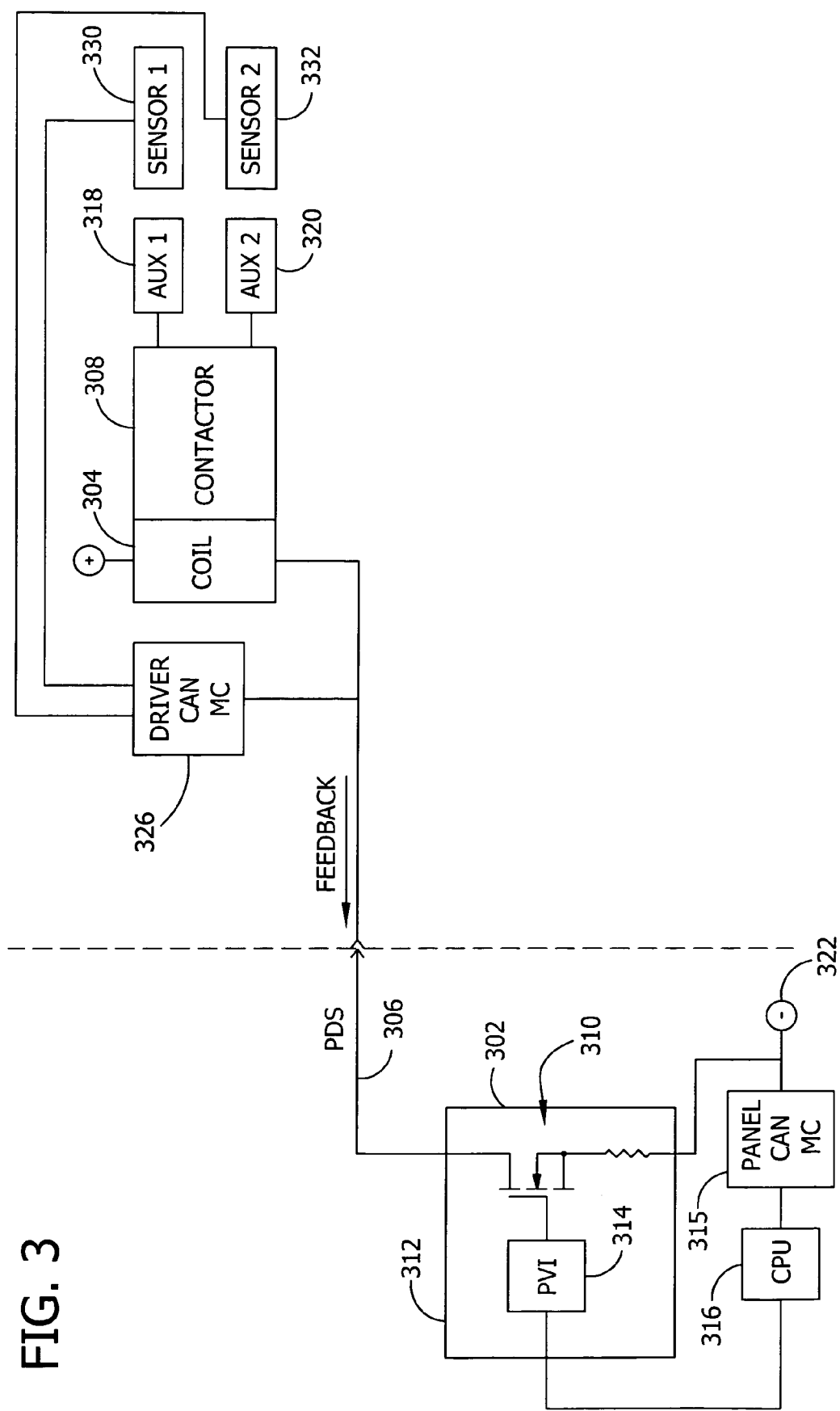
FIG. 3 is a schematic diagram of one embodiment of a CAN based distributed driver locomotive system according to the invention showing a digital output driver driving a device such as a contactor coil for opening and closing contactors via a power distribution system (PDS) wherein a panel CAN microcontroller associated with a locomotive CPU interfaces with a driver CAN microcontroller associated with a contactor coil via modulated signals superimposed on the PDS.

FIG. 3 is a schematic diagram of one embodiment of a CAN-based distributed driver system for a locomotive (and/or OHV) according to the invention. A digital driver output 302 drives a contactor coil 304 via a power distribution system 306. In this illustrated embodiment, the power distribution 306 is a signal wire that connects the coil 304 of the contactor 308 to a power source 322 via an FET 310 in a control panel 312 which is to the right of the dashed line and remote from the aspects of the system. As a result, the FET 310 switches the coil 304 on and off to selectively open and close the contactors 308. The FET 310 is driven through a photovoltaic isolator 314 or other type of voltage isolation device in order to isolate a control CPU 316 and other electronics connected thereto from any voltage transients in the power distribution system. In this FIG. 3 embodiment, a panel CAN MC 315 associated with the locomotive CPU 316 interfaces with a driver CAN MC 326 associated with remote devices such as a first auxiliary device 318 and a second auxiliary device 320. The panel CAN MC 315 communicates with the driver CAN MC 326 via modulated signals superimposed on the power distribution system 306. In operation, the CPU 316 selectively turns on and turns off the power distribution system being supplied to the remote equipment by controlling the photovoltaic isolator 314 which in turn controls the FET 310 to selectively close and connect the power source 322 to the coil 304. In addition, closing the FET 310 establishes a communication channel along the power distribution system 306, which communication channel allows signals to be exchanged between the driver CAN MC 326 and the panel CAN MC 315.

The embodiment illustrated in FIG. 3 also contemplates that the remote equipment include a first sensor 330 monitoring the operation or status of the first auxiliary device 318 and a second sensor 332 monitoring the operation or status of the second auxiliary device 320. The sensors provide first and second sensor signals, respectively, to the driver CAN MC 326 which converts the sensor signals to modulated signals provided over the power distribution system to the panel CAN MC 315 and subsequently to the CPU 316.

Thus FIG. 3 illustrates a system for use with a locomotive CPU 316 controlling first and second auxiliary devices 318 and 320 of the locomotive which are remote from the locomotive. The remote equipment includes a driver such as coil 304 for opening and closing one or more contactors 308 for selectively energizing the first and second auxiliary devices 318 and 320. The driver CAN MC 326 is associated with the driver and a panel switch such as FET 310 selectively supplies power to the coil 304. The power distribution system 306 connects the coil 304 to the power source 332 which is remote from the remote equipment via the panel switch FET 310. The panel CAN MC 315 associated with the locomotive CPU 316 interfaces therewith and also interfaces with the driver CAN MC 326 to provide control signals to the driver CAN MC 326 and to receive status signals from the driver CAN MC 326.

It is also contemplated that in one embodiment, the invention comprises a retrofit system for use with a locomotive processor 316 controlling an auxiliary device 318, 320 of the locomotive. In this embodiment, the driver 304, 308 selectively energizes the auxiliary device(s) 318, 320 of the locomotive. The panel switch 310 selectively supplies power to the driver 304, 308. The power distribution system 306 connects the driver 304, 308 to the panel switch 310. The retrofit system comprises the driver CAN microcontroller 326 and the panel CAN microcontroller 315. The driver CAN microcontroller 326 is associated with the driver 304, 308 and is coupled to the power distribution system 326. The panel CAN microcontroller 315 is associated with the locomotive processor 316 and is coupled to the power distribution system 306. The driver CAN microcontroller 326 and the panel CAN microcontroller 315 communicate with each other via the power distribution system 306.

What is claimed is:

1. A system for use with a processor of a locomotive or an off-highway vehicle (OHV), which processor controls an auxiliary device of the locomotive or OHV, said system comprising:
a driver for selectively energizing the auxiliary device of the locomotive or OHV;
a driver switch for selectively activating the driver;
a driver controller area network (CAN) microcontroller controlling the driver switch;
a panel switch for selectively supplying power to the driver CAN microcontroller and the driver switch;
a power distribution system connecting the driver CAN microcontroller and the driver switch to the panel switch; and
a panel CAN microcontroller responsive to the processor for controlling the panel switch.

2. The system of claim 1 wherein the driver CAN microcontroller provides to the panel CAN microcontroller via the power distribution system a feedback signal and wherein the panel CAN microcontroller provides a signal corresponding to the feedback signal to the processor.

3. The system of claim 2 further comprising an auxiliary sensor associated with the auxiliary device and providing a sensor signal to the driver CAN microcontroller and wherein the driver CAN microcontroller provides to the panel CAN microcontroller via the power distribution system a feedback signal corresponding to the sensor signal and wherein the panel CAN microcontroller provides a signal corresponding to the feedback signal to the processor.

4. The system of claim 3 wherein the panel CAN microcontroller and the driver CAN microcontroller communicate via modulated signals superimposed on the power distribution system.

5. The system of claim 4 wherein the driver CAN microcontroller provides to the panel CAN microcontroller via the power distribution system a modulated feedback signal superimposed on the power distribution system.

6. The system of claim 1 wherein the driver CAN microcontroller provides to the panel CAN microcontroller a feedback signal and wherein the panel CAN microcontroller provides a signal corresponding to the feedback signal to the processor.

7. The system of claim 1 further comprising an auxiliary sensor associated with the auxiliary device and providing a sensor signal to the driver CAN microcontroller and wherein the driver CAN microcontroller provides to the panel CAN microcontroller a feedback signal corresponding to the sensor signal and wherein the panel CAN microcontroller provides a signal corresponding to the feedback signal to the processor.

8. The system of claim 1 wherein the panel CAN microcontroller and the driver CAN microcontroller communicate via modulated signals superimposed on the power distribution system.

9. The system of claim 8 wherein the driver CAN microcontroller provides to the panel CAN microcontroller via the power distribution system a modulated feedback signal superimposed on the power distribution system.

10. A system for use with a locomotive or an off-highway vehicle (OHV) processor controlling an auxiliary device of the locomotive or OHV, said system comprising:
- a driver for opening and closing a device for selectively energizing the auxiliary device of the locomotive or OHV;
- a driver controller area network (CAN) microcontroller associated with the driver switch;
- a panel switch for selectively supplying power to the driver;
- a power distribution system connecting the driver to the panel switch; and
- a panel CAN microcontroller associated with the processor for interfacing with the driver CAN microcontroller.

11. The system of claim 10 wherein the driver CAN microcontroller provides to the panel CAN microcontroller via the power distribution system a feedback signal and wherein the panel CAN microcontroller provides a signal corresponding to the feedback signal to the processor.

12. The system of claim 11 further comprising an auxiliary sensor associated with the auxiliary device and providing a sensor signal to the driver CAN microcontroller and wherein the driver CAN microcontroller provides to the panel CAN microcontroller via the power distribution system a feedback signal corresponding to the sensor signal and wherein the panel CAN microcontroller provides a signal corresponding to the feedback signal to the processor.

13. The system of claim 12 wherein the panel CAN microcontroller and the driver CAN microcontroller communicate via modulated signals superimposed on the power distribution system.

14. The system of claim 13 wherein the driver CAN microcontroller provides to the panel CAN microcontroller via the power distribution system a modulated feedback signal superimposed on the power distribution system.

15. The system of claim 10 wherein the driver CAN microcontroller provides to the panel CAN microcontroller a feedback signal and wherein the panel CAN microcontroller provides a signal corresponding to the feedback signal to the processor.

16. The system of claim 10 further comprising an auxiliary sensor associated with the auxiliary device and providing a sensor signal to the driver CAN microcontroller and wherein the driver CAN microcontroller provides to the panel CAN microcontroller a feedback signal corresponding to the sensor signal and wherein the panel CAN microcontroller provides a signal corresponding to the feedback signal to the processor.

17. The system of claim 10 wherein the panel CAN microcontroller and the driver CAN microcontroller communicate via modulated signals superimposed on the power distribution system.

18. The system of claim 17 wherein the driver CAN microcontroller provides to the panel CAN microcontroller via the power distribution system a modulated feedback signal superimposed on the power distribution system.

19. A retrofit system for use with a processor of a locomotive or an off-highway vehicle (OHV), which processor controls an auxiliary device of the locomotive or OHV, wherein the locomotive or OHV includes:
- a driver for selectively energizing the auxiliary device of the locomotive or OHV;
- a panel switch for selectively supplying power to the driver; and
- a power distribution system connecting the driver to the panel switch;

the retrofit system comprising:
- a driver switch adapted to selectively activate the driver;
- a driver controller area network (CAN) microcontroller for controlling the driver switch wherein the driver CAN microcontroller is adapted to receive power from and is connected to the power distribution system; and
- a panel CAN microcontroller responsive to the processor for controlling the panel switch wherein the panel CAN microcontroller is adapted to receive power from and is connected to the power distribution system and wherein the driver CAN microcontroller and the panel CAN microcontroller communicate with each other via the power distribution system.

20. The system of claim 19 wherein the driver CAN microcontroller provides to the panel CAN microcontroller via the power distribution system a feedback signal and wherein the panel CAN microcontroller provides a signal corresponding to the feedback signal to the processor.

21. The system of claim 20 further comprising an auxiliary sensor associated with the auxiliary device and providing a sensor signal to the driver CAN microcontroller and wherein the driver CAN microcontroller provides to the panel CAN microcontroller via the power distribution system a feedback signal corresponding to the sensor signal and wherein the panel CAN microcontroller provides a signal corresponding to the feedback signal to the processor.

22. The system of claim 21 wherein the panel CAN microcontroller and the driver CAN microcontroller communicate via modulated signals superimposed on the power distribution system.

23. The system of claim 22 wherein the driver CAN microcontroller provides to the panel CAN microcontroller via the power distribution system a modulated feedback signal superimposed on the power distribution system.

24. The system of claim 19 wherein the driver CAN microcontroller provides to the panel CAN microcontroller a feedback signal and wherein the panel CAN microcontroller provides a signal corresponding to the feedback signal to the processor.

25. The system of claim 19 further comprising an auxiliary sensor associated with the auxiliary device and providing a sensor signal to the driver CAN microcontroller and wherein the driver CAN microcontroller provides to the panel CAN microcontroller a feedback signal corresponding to the sensor signal and wherein the panel CAN microcontroller provides a signal corresponding to the feedback signal to the processor.

26. The system of claim 19 wherein the panel CAN microcontroller and the driver CAN microcontroller communicate via modulated signals superimposed on the power distribution system.

27. The system of claim 26 wherein the driver CAN microcontroller provides to the panel CAN microcontroller via the power distribution system a modulated feedback signal superimposed on the power distribution system.

28. A retrofit system for use with a locomotive or an off-highway vehicle (OHV) processor controlling an auxiliary device of the locomotive or OHV, wherein the locomotive or OHV includes:
 a driver for selectively energizing the auxiliary device of the locomotive or OHV;
 a panel switch for selectively supplying power to the driver; and
 a power distribution system connecting the driver to the panel switch;
the retrofit system comprising:
 a driver controller area network (CAN) microcontroller associated with the driver and coupled to the power distribution system; and
 a panel CAN microcontroller associated with the processor and coupled to the power distribution system, wherein the driver CAN microcontroller and the panel CAN microcontroller communicate with each other via the power distribution system.

29. The system of claim 28 wherein the driver CAN microcontroller provides to the panel CAN microcontroller via the power distribution system a feedback signal and wherein the panel CAN microcontroller provides a signal corresponding to the feedback signal to the processor.

30. The system of claim 29 further comprising an auxiliary sensor associated with the auxiliary device and providing a sensor signal to the driver CAN microcontroller and wherein the driver CAN microcontroller provides to the panel CAN microcontroller via the power distribution system a feedback signal corresponding to the sensor signal and wherein the panel CAN microcontroller provides a signal corresponding to the feedback signal to the processor.

31. The system of claim 30 wherein the panel CAN microcontroller and the driver CAN microcontroller communicate via modulated signals superimposed on the power distribution system.

32. The system of claim 31 wherein the driver CAN microcontroller provides to the panel CAN microcontroller via the power distribution system a modulated feedback signal superimposed on the power distribution system.

33. The system of claim 28 wherein the driver CAN microcontroller provides to the panel CAN microcontroller a feedback signal and wherein the panel CAN microcontroller provides a signal corresponding to the feedback signal to the processor.

34. The system of claim 28 further comprising an auxiliary sensor associated with the auxiliary device and providing a sensor signal to the driver CAN microcontroller and wherein the driver CAN microcontroller provides to the panel CAN microcontroller a feedback signal corresponding to the sensor signal and wherein the panel CAN microcontroller provides a signal corresponding to the feedback signal to the processor.

35. The system of claim 28 wherein the panel CAN microcontroller and the driver CAN microcontroller communicate via modulated signals superimposed on the power distribution system.

36. The system of claim 35 wherein the driver CAN microcontroller provides to the panel CAN microcontroller via the power distribution system a modulated feedback signal superimposed on the power distribution system.

* * * * *